United States Patent [19]

Ellefson

[11] Patent Number: 5,109,628
[45] Date of Patent: May 5, 1992

[54] MOLE AND GOPHER CONTROL APPARATUS

[76] Inventor: Lee J. Ellefson, 1143 Newport, Coos Bay, Oreg. 97420

[21] Appl. No.: 529,535

[22] Filed: May 29, 1990

[51] Int. Cl.$^5$ .............................................. A01M 13/00
[52] U.S. Cl. ........................................ 43/124; 43/125; 43/129
[58] Field of Search .................... 43/124, 125, 129, 130

[56] References Cited

U.S. PATENT DOCUMENTS

| | | | |
|---|---|---|---|
| 1,290,544 | 1/1919 | Graumann | 43/124 |
| 1,309,193 | 7/1919 | Garrison | 43/124 |
| 1,492,732 | 5/1924 | Knopf | 43/124 |
| 1,642,920 | 9/1927 | Cooper | 43/124 |
| 1,888,732 | 11/1932 | Mathes | 43/124 |
| 1,938,378 | 12/1933 | Ell | 43/125 |
| 2,662,332 | 12/1953 | McIntire | 43/129 |
| 2,851,818 | 9/1958 | Matheny | 43/129 |
| 2,906,056 | 9/1959 | Youngblood | 43/124 |
| 4,829,766 | 5/1989 | Perry | 43/125 |

*Primary Examiner*—Kurt Rowan
*Attorney, Agent, or Firm*—Leon Gilden

[57] ABSTRACT

An apparatus includes a container with a lid securable thereon, with a first inlet elbow fixedly mounted to the lid and directed interiorly of the container, and an outlet elbow positioned adjacent the inlet elbow in communication with the interior of the container. A blower motor and nozzle is directed to direct pressurized air through the inlet elbow, wherein volatile noxious fluids are permitted to vitalize, wherein such directed gases are directed through the outlet elbow and an associated flexible conduit through a nozzle into an associated gopher hole and the like. Modifications of the invention include a postioning plate and spikes mounted orthogonally relative to an axis of the nozzle for securement of the nozzle relative to the gopher hole and may further include a threaded inlet tube to permit directing of components into the container with the lid secured thereon during use of the organization. Further, a plurality of conical plugs may be provided and mounted exteriorly of the container for the plugging of other gopher holes to contain the noxious gases within the gopher hole environment to enhance its effectiveness against gopher and mole inhabitants.

1 Claim, 4 Drawing Sheets

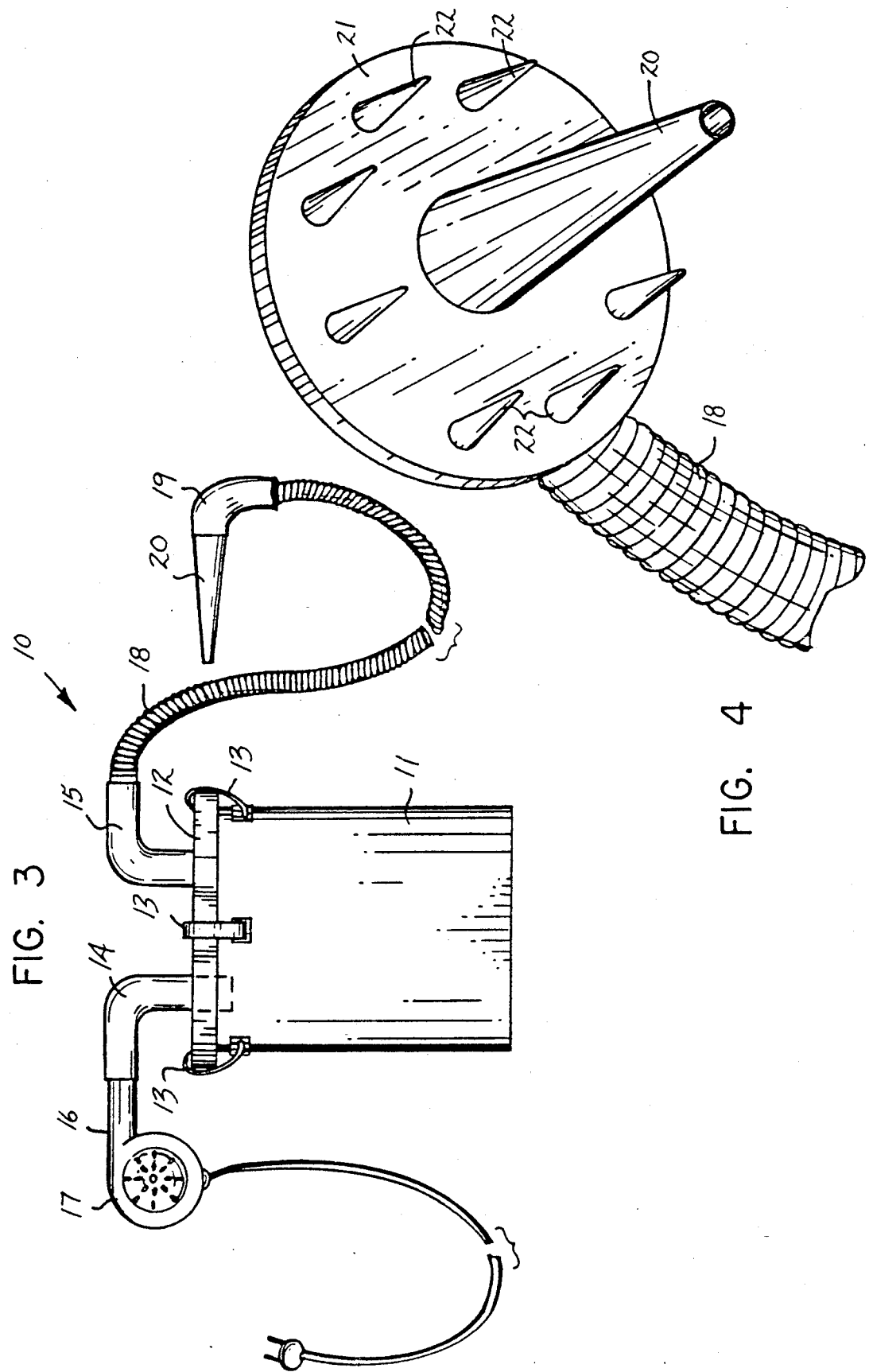

MOLE AND GOPHER CONTROL APPARATUS

BACKGROUND OF THE INVENTION

1. Field of the Invention

The field of invention relates to rodent control devices, and more particularly pertains to a new and improved mole and gopher control apparatus wherein the same permits a directing of noxious gases within a gopher hole and tunnel organization.

2. Description of the Prior Art

Rodents, and particularly gophers and moles, are of a continuous threat to various plants and crops, where infestation and associated burrowing of such gophers and moles enhances erosion due to the destruction of surrounding vegetation and crops, as well as economic loss resultant therefrom. It is frequently found that such burrowing rodents may direct burrows great distances beneath the ground to create subterranean tunnels. The instant invention attempts to provide an efficient and effective, yet compactly arranged, organization to direct noxious fumes within a tunnel network of such gophers and moles to effect extermination or enhance their exiting the immediate area. Prior art devices to direct rodent control substances within a tunnel network may be found in U.S. Pat. No. 4,841,668 to McKenzie wherein a rodent control system utilizes a plunger to direct a poison impregnated attractant, such as molasses, into the tunnel network.

U.S. Pat. No. 4,005,976 to Rombach, et al. directs a gas fired gas/air mixture into the burrow system of a mole or gopher-type rodent.

U.S. Pat. No. 1,295,397 to Watts sets forth a manually cranked impeller device for directing fumes or vapors into an underground system defined as a unitary rigid organization.

U.S. Pat. No. 1,309,193 to Garrison sets forth a gas-fired container to direct fumes into an underground burrow system from the furnace portion within the container.

U.S. Pat. No. 4,688,349 to Renth sets forth an apparatus for application of insecticide throughout a building structure by utilizing pressurized air to direct the insecticide through a nozzle.

As such, it may be appreciated that there continues to be a need for a new and improved mole and gopher control apparatus wherein the same addresses both the problems of ease of use as well as effectiveness and compactness in construction and in this respect, the present invention substantially fulfills this need.

SUMMARY OF THE INVENTION

In view of the foregoing disadvantages inherent in the known types of rodent control apparatus now present in the prior art, the present invention provides a mole and gopher control apparatus wherein the same utilizes an organization to direct noxious fumes into an underground burrow system. As such, the general purpose of the present invention, which will be described subsequently in greater detail, is to provide a new and improved mole and gopher control apparatus which has all the advantages of the prior art rodent control devices and none of the disadvantages.

To attain this, the present invention provides an apparatus including a container with a lid securable thereon, with a first inlet elbow fixedly mounted to the lid and directed interiorly of the container, and an outlet elbow positioned adjacent the inlet elbow in communication with the interior of the container. A blower motor and nozzle is directed to direct pressurized air through the inlet elbow, wherein volatile noxious fluids are permitted to vitalize, wherein such directed gases are directed through the outlet elbow and an associated flexible conduit through a nozzle into an associated gopher hole and the like. Modifications of the invention include a positioning plate and spkes mounted orthogonally relative to an axis of the nozzle for securement of the nozzle relative to the gopher hole and may further include a threaded inlet tube to permit directing of components into the container with the lid secured thereon during use of the organization. Further, a plurality of conical plugs may be provided and mounted exteriorly of the container for the plugging of other gopher holes to contain the noxious gases within the gopher hole environment to enhance its effectiveness against gopher and mole inhabitants.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved mole and gopher control apparatus which has all the advantages of the prior art rodent control devices and none of the disadvantages.

It is another object of the present invention to provide a new and improved mole and gopher control apparatus which may be easily and efficiently manufactured and marketed.

It is a further object of the present invention to provide a new and improved mole and gopher control apparatus which is of a durable and reliable construction.

An even further object of the present invention is to provide a new and improved mole and gopher control apparatus which is susceptible of a low cost of manufacture with regard to both materials and labor, and which accordingly is then susceptible of low prices of sale to the consuming public, thereby making such mole and gopher control apparatus economically available to the buying public.

Still yet another object of the present invention is to provide a new and improved mole and gopher control apparatus which provides in the apparatuses and methods of the prior art some of the advantages thereof, while simultaneously overcoming some of the disadvantages normally associated therewith.

Still another object of the present invention is to provide a new and improved mole and gopher control apparatus wherein the same directs a pressurized flow of a noxious medium into an underground burrow system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view, taken in elevation, of the instant invention.

FIG. 4 is an isometric illustration of a positioning plate utilized in combination with the nozzle of the instant invention.

DESCRIPTION OF THE PREFERRED EMBODIMENT

Figure 1:
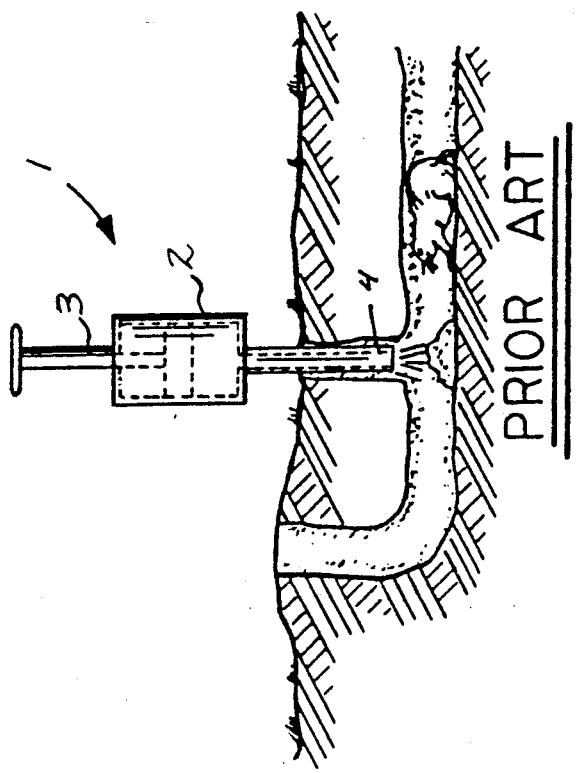
FIG. 1 is an orthographic view, taken in elevation, of a prior art rodent control apparatus.

With reference now to the drawings, and in particular to FIGS. 1 to 7 thereof, a new and improved mole and gopher control apparatus embodying the principles and concepts of the present invention and generally designated by the reference numeral 10 will be described.

Figure 2:
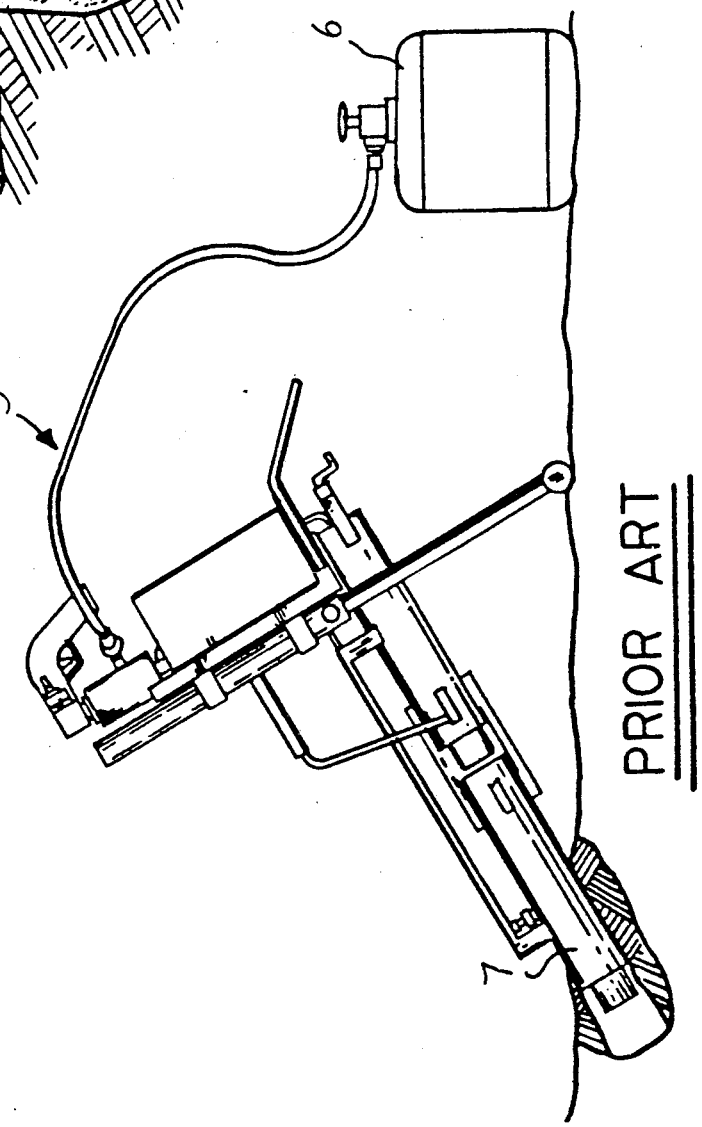
FIG. 2 is an orthographic side view, taken in elevation, of a further prior art rodent control organization.

FIG. 1 illustrates a prior art organization 1, wherein a cylinder housing 2 admits a reciprocatable plunger and enclosed internal piston 3 to direct a poison impregnated substance through a nozzle 4 that is projected through a rodent opening of a tunnel network. FIG. 2 illustrates a further prior art device 5 utilizing a flammable gas container 6 to direct a nozzle 7 to project the burning gas/air mixture into the tunnel network.

More specifically, the mole and gopher control apparatus 10 of the instant invention essentially comprises a container 11, including a lid 12 securable thereon, with a plurality of lid clamps 13 pivotally mounted adjacent an upper terminal end of the container 11 to overlie and secure the lid onto the container, with a clamp 13 positioned at each quadrant of the lid 12 to ensure a sealing engagement of the lid relative to the container. An inlet elbow duct 14 is integrally mounted to the lid 12 to direct the inlet duct in communication with the interior of the container and lid compartment, with a vertical leg of the inlet elbow duct 14 arranged orthogonally relative to the lid 12 and a horizontal leg arranged parallel thereto to receive a blower motor nozzle 16 within the inlet elbow duct 14 in operative association with a blower motor 17 to effect a pressurized directing of air current into the compartment defined by the lid 12 and the container 11. An outlet elbow duct 15 includes a vertical leg mounted orthogonally relative to the lid 12 and integrally thereto, with a horizontal component of the elbow duct 15 arranged orthogonally relative to the vertical leg to position the horizontal components of the inlet and elbow ducts in a generally parallel relationship for convenience of positioning of the organization adjacent a gopher inlet hole, and including a flexible corrugated delivery tube 18 fixedly mounted to the free end of the horizontal component of the outlet elbow duct 15. It should be noted that the various components of the organization, such as the inlet and outlet elbows, as well as the container lid, are all formed of a fluid impermeable construction, such as stainless steel, polymeric, and the like. The corrugated delivery tube 18 includes a nozzle elbow 19 mounted at a free terminal end thereof remote from the container 11, with a tapered conical venturi nozzle 20 coaxially aligned with an outlet portion of the nozzle elbow 19 to permit directing of the venturi nozzle 20 within a mole or gopher burrow hole.

FIG. 4 illustrates the use of a positioning plate 21 integrally and orthogonally mounted about the venturi nozzle 20, and arranged generally orthogonally to the axis defined by the conical nozzle 20, and including a matrix of projecting positioning spikes 22 whose axes are arranged generally parallel to the axis defined by the venturi nozzle 20 to enhance securement of the positioning plate 21 about a gopher hole and the like and maintain alignment of the nozzle 20 within the aforenoted entrance hole.

Figure 5:
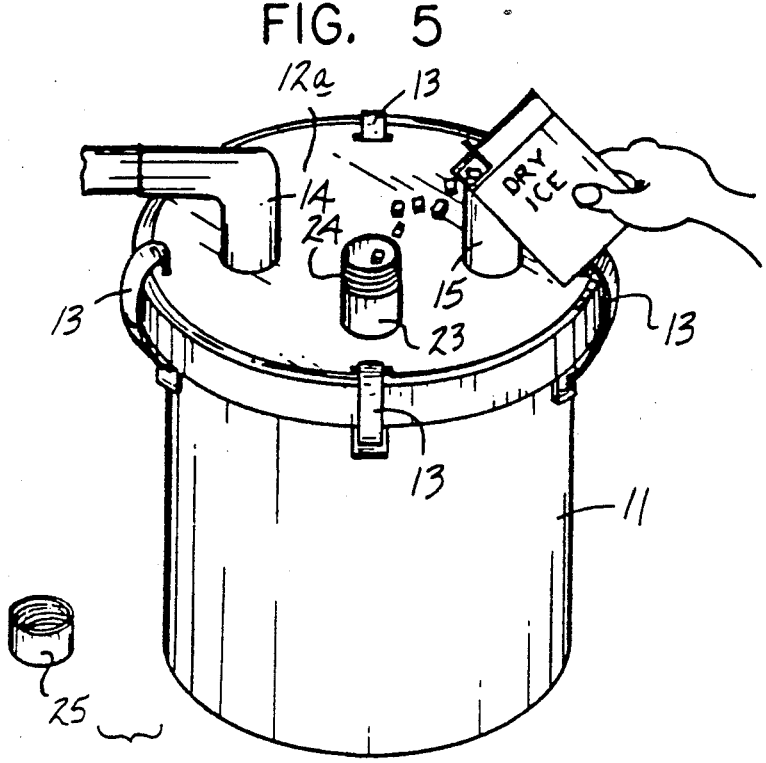
FIG. 5 is an isometric illustration of a modified lid utilized by the instant invention.

FIG. 5 illustrates the use of a modified lid 12a employing a rigid entrance 23, including a threaded terminal upper end 24 to receive an internally threaded cap 25 thereabout during periods of non-use, whereupon the lid 25 may be removed to permit additions of various chemicals within the container 11, and particularly crystalline material such as "dry ice" to direct an additional component such as carbon dioxide into the gopher or mole tunnel network, in addition to other chemicals that are provided within the container, and particularly volatile chemicals such as various petroleum distillates, as well as liquid pesticides of volatile nature and the like.

Figure 6:
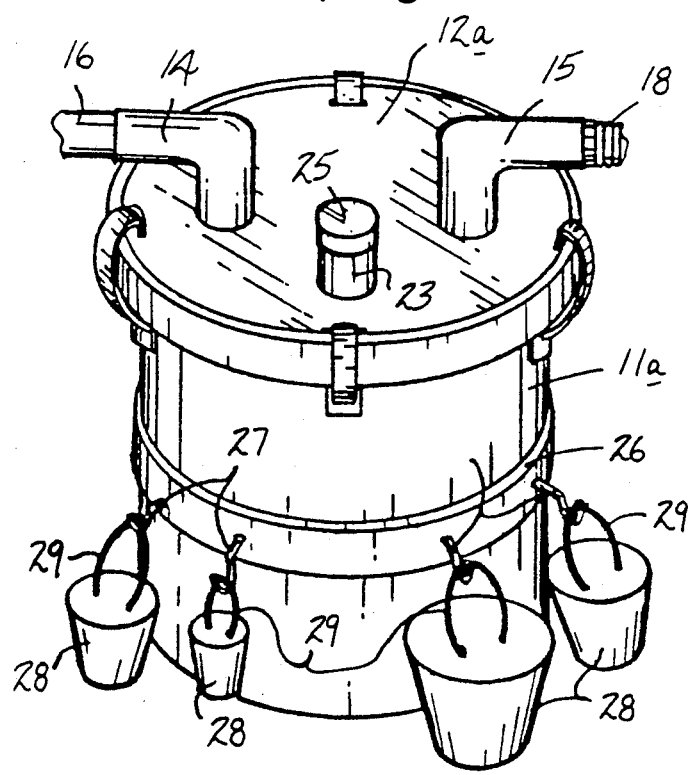
FIG. 6 is an isometric illustration of the modified lid in cooperation with a modified container utilized by the instant invention.
Figure 7:
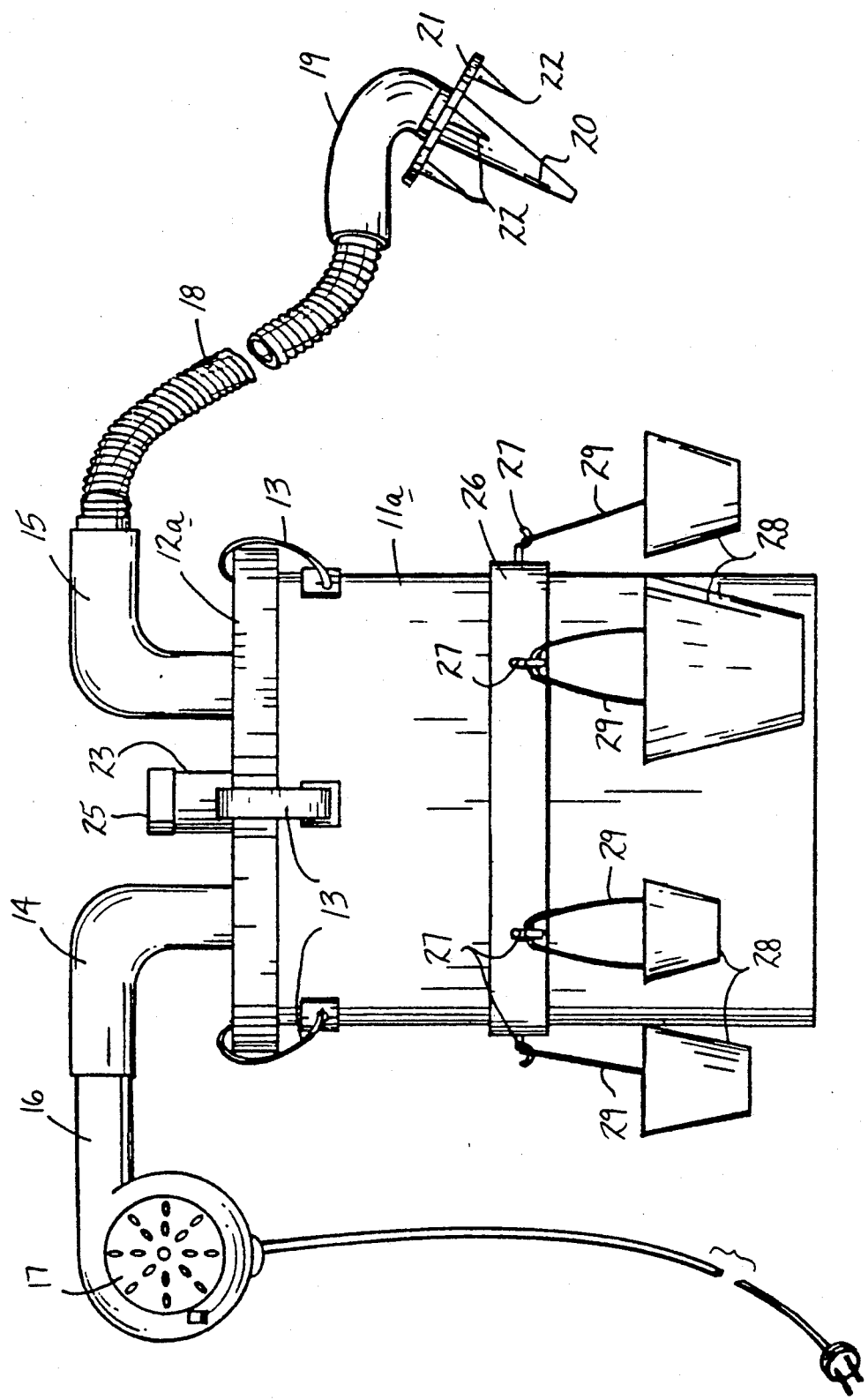
FIG. 7 is an orthographic side view, taken in elevation, of the modified lid and container apparatus utilized in combination.

FIG. 6 illustrates the use of the modified lid 12a in cooperation with a modified container 11a, wherein a circumferential belt 26 is integrally mounted about an exterior surface of the container 11 and includes a series of outwardly directed hooks 27 fixedly mounted about the belt 26 to receive a like plurality of truncated conical plugs 28, including loop members 29 to permit securement of each of the plugs 28 onto each of the hooks 27. The conical plugs 28 are of varying sizes to permit plugging of adjacent entrance or exit openings of a tunnel network to enhance effectiveness in the directing of noxious fumes within the network by the instant invention.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable volatile fluid discharging apparatus comprising, in combination,
   a container arranged for receiving a predetermined quantity of said fluid, and
   a lid securable to the container overlying an upper terminal end of the container to define a compartment therewithin, and
   a first outlet duct directed through the lid and fixedly mounted to the lid into the compartment, and
   an outlet duct fixedly mounted to the lid in pneumatic communication with the compartment, and
   a blower means in operative association with the inlet duct to direct pressurized air into the compartment, and
   a flexible delivery tube secured to a free terminal end of the outlet duct to receive a pressurized gas mixture from the compartment, and
   a tapered conical venturi nozzle mounted to a forward terminal end of the delivery tube remote from the outlet duct to direct the gas mixture through the venturi tube at a predetermined velocity, and
   wherein the container includes a plurality of clamps, each of the clamps pivotally mounted to the container at a lower terminal end of each clamp to permit pivotment of each clamp relative to the container permit overlying engagement of an upper surface of the lid to secure the lid to the container, and a clamp positioned at each quadrant of the lid and container to ensure a sealing relationship between the lid and the container, and
   wherein the inlet duct is defined as an elbow, including an inlet vertical duct leg integrally secured to the lid, and a horizontal inlet duct leg arranged parallel to a top surface of the lid, and the outlet duct including an outlet duct vertical leg integrally secured to the lid and arranged parallel to the inlet duct vertical leg, and an outlet duct horizontal leg arranged orthogonally to the outlet duct vertical leg and arranged parallel to the inlet duct horizontal leg, and
   wherein the blower means includes a blower nozzle received within the inlet duct horizontal leg, and the outlet duct horizontal leg including the delivery tube secured thereto, wherein the delivery tube is defined as an elongate flexible corrugated delivery tube to permit flexure of the tube and orientation of the tube relative to the outlet duct, and
   wherein the venturi nozzle is defined by a venturi nozzle axis, and a positioning plate integrally mounted about the venturi nozzle and orthogonally aligned relative to the venturi nozzle axis, and the positioning plate including a matrix of spikes integrally and orthogonally mounted to the positioning plate, wherein the spikes are each arranged parallel to the venturi nozzle axis, and
   wherein the container includes a circumferential belt fixedly mounted about an exterior surface of the container, and the belt including a predetermined number of outwardly directed hooks orthogonally mounted to the belt, and each hook including a truncated conical plug mounted thereto, and each plug defined by a varying conical configuration to accommodate variously sized rodent openings of a subterranean tunnel network.

* * * * *